2,878,290

NITROGUANIDINE PREPARATION

William D. Gersumky, Greenwich, and Hunt Sutherland, Springdale, Conn., assignors to American Cyanamid Company, New York, N. Y., a corporation of Maine No Drawing. Application July 23, 1956
Serial No. 599,340

2 Claims. (Cl. 260—564)

This invention relates to the nitration of organic compounds. More particularly, it relates to the nitration of guanidine nitrate in anhydrous nitric acid as the sole nitrating agent.

Heretofore, various acid menstruums have been employed for nitrating organic compounds. For example, in the nitration of guanidine nitrate, a mixture comprising nitric acid and sulfuric acid has been used as a nitrating medium. Also, fuming nitric acid of commercial grade has been employed. However, such nitrating agents are not entirely satisfactory, principally because yields of nitrated product so-obtained in many cases are considered commercially unacceptable. The yields are found to be substantially less than quantitative.

Moreover, the usual procedure for the recovery of desired product comprises drowning a so-nitrated solution in large volumes of water to precipitate resultant dissolved nitrated product. Loss of yield is experienced due to the relative solubility of the nitrated product. When using fuming nitric acid alone, the drowned solution is so dilute in nitric acid an impractical amount of water must be removed to recover useable nitric acid. After solids removal, drowned solution is usually discarded. In the event mixtures of nitric and sulfuric acids are used as the nitrating medium, distillation procedures are generally found uneconomical and a usual practice is also to dispose of such spent mixtures.

It is therefore a principal object of the invention to provide a process for obtaining nitroguanidine in good yields. It is a further object of the invention to provide a process wherein heretofore necessary water-drowning procedures for the recovery of nitrated product are eliminated.

These objects and other advantages apparent to those skilled in the art are successfully attained in a surprisingly straight-forward manner by effecting the nitration of guanidine nitrate in an anhydrous nitric acid medium. As used herein, the term "anhydrous nitric acid" is intended to include and defined as containing 100% nitric acid but not less than 96% nitric acid, the balance being water. In the present process, the nitration releases water and the nitric acid is thereby diluted but not to less than 93%. It has been found that in employing a solution initially containing less than 96% nitric acid, acceptable product yields are not attained. Moreover, such yields fall off sharply if in use solutions become diluted to above about 7% by weight of water.

According to the present invention, guanidine nitrate is added preferably with agitation to anhydrous nitric acid containing from zero to not more than four percent of water until guanidine nitrate dissolves therein. Nitration of the guanidine nitrate to nitroguanidine occurs with the formation of water. However, it is a critical provision of the invention that the water released from guanidine nitrate added to the anhydrous nitric acid does not dilute said nitric acid to more than 93%.

Recovery of the nitroguanidine is variously accomplished by means known to the art. For example, the resultant solution may be either evaporated or vacuum distilled to recover a residue comprising essentially nitroguanidine. Evaporated or distilled nitric acid may be readily recovered and reused since the bulk of the nitrating menstruum contains nitric acid having a maximum of 7% water. The nitroguanidine residue may be further purified as by slurrying the latter in water and neutralizing any residual acid with an alkali such as sodium carbonate. Resultant slurry can next be filtered and dried to recover nitroguanidine substantially free from nitric acid.

Anydrous nitric acid which is employed in the present invention may be prepared by methods well known to the art. For example, one such method involves the introduction of approximately 550 parts (by weight) of potassium nitrate and 800 parts (by weight) of 97% sulfuric acid into a flask equipped with a thermometer, stirrer and distillation condenser. Anhydrous nitric acid is distilled over at from about 40° C. to about 50° C. and at about 40 mm. Hg pressure into a suitably cooled receiver. 200 parts of anhydrous nitric acid containing 99.5% to 100% acid (as titrated with sodium hydroxide) is obtained.

It is an advantage of the present invention that although the nitrating agent be "anhydrous," the amount of nitrating agent which comprises the reaction medium is not critical. However, the amount of terminal water in the anhydrous nitric acid, which water is present as a result of the nitration reaction, must be controlled in order to succeed in attaining the objects set forth above. Stated otherwise, in the latter nitrating reaction the anhydrous nitric acid must be maintained at 93% or above, for otherwise acceptable yields cannot be had. Control, for example, may be had by adding predetermined amounts of guanidine nitrate to known concentrations of anhydrous nitric acid. The amount of water which would theoretically form as a result of the reaction can be readily calculated.

To further illustrate the invention, the following illustrative examples are presented which are not to be construed as being limitative. Unless otherwise stated, the parts given are by weight.

*Example 1*

To 15 parts of 100% nitric acid are added 5 parts of guanidine nitrate in a suitable reaction vessel. The mixture is stirred until complete solution occurs. Nitration of guanidine nitrate to nitroguanidine occurs with the formation of 3.5% water, thus reducing the concentration of nitric acid from 100% to 96.5%. The solution is vacuum distilled at 40° C. and 300 mm. Hg pressure to recover anhydrous nitric acid and a nitroguanidine residue. Resultant residue is slurried in 40 parts of water. The slurry is heated until a solution appears. The solution is neutralized by the addition of sodium carbonate. Upon cooling to room temperature, solids reappeared in the solution. The latter is filtered and recovered solids are dried. The solids constitute nitroguanidine substantially free from nitric acid in approximately 95% yield.

Instead of vacuum distillation, the solution containing dissolved nitroguanidine can be evaporated as by blowing a stream of air over the solution and recovering a residue. If desired, the residue may be purified by the method outlined above.

*Example 2*

1 part of guanidine nitrate is added to 3 parts of anhydrous nitric acid (99.1%) at 25° C. in a glass vessel equipped with thermometer, stirrer, and condensor. The resulting clear solution having a terminal acid concentration of 95% is heated at from about 30° C. to 40° C. for about eight minutes. It is then distilled under a vacuum of about 285 mm. Hg pressure. Recovered anhydrous nitric acid can be reused. Resultant residue comprising crude nitroguanidine is slurried in seven times its weight in water and reheated to about 100° C. The acidity of the hot solution is adjusted from a pH of about 6 to a pH of between about 6.5 and about 7 by the addition thereto of a few drops of aqueous sodium carbonate. The solution so-neutralized is then drowned in sufficient water so that a 5% slurry of nitroguanidine is obtained. The slurry is then cooled to about 10° C., filtered and the product dried in a vacuum of about 85° C. A yield of 89.4% of nitroguanidine substantially free from nitric acid is obtained.

*Example 3*

Repeating the procedure of Example 2 in every material detail, the following runs have been made and the results thereof are tabularized as follows:

| Run | Guanidine Nitrate, Grams | $HNO_3$, Grams | Acid Concentration, Percent | | Nitroguanidine, Percent Yield |
|---|---|---|---|---|---|
| | | | Start | End | |
| 81 | 3.00 | 15.0 | 99.1 | 96.5 | 91.0 |
| 82 | 3.10 | 17.0 | 97.9 | 95.6 | 91.7 |
| 83 | 1.47 | 19.0 | 97.1 | 96.0 | 89.3 |
| 84 | 4.42 | 19.0 | 97.1 | 94.2 | 91.7 |
| 71 | 4.5 | 15.0 | ¹90.0 | 88.2 | 46.6 |
| 72 | 4.3 | 16.0 | 96.0 | 93.1 | 89.2 |

¹ Commercial fuming nitric acid.

From the above derived data, it can be readily seen that where commercial grade nitric acid (90%) is employed, the yield of nitroguanidine is substantially reduced.

We claim:

1. In the conversion of guanidine nitrate to nitroguanidine the improved procedure consisting of the steps of establishing a predetermined amount of an aqueous treating medium consisting essentially of nitric acid and water only, the initial nitric acid content of said medium being at least 96 percent by weight; agitating said medium; and adding thereto a finite weight of guanidine nitrate, whereby nitroguanidine is formed with concomitant release of water and decrease in nitric acid content of said medium; maintaining the weight ratio of said added guanidine nitrate to said initial nitric acid content of said medium below that at which said release of water can occur in sufficient amount to produce a terminal nitric acid content of said medium less than about 93%; and recovering nitroguanidine from resultant solution.

2. A process according to claim 1 in which said weight ratio of added guanidine nitrate to said initial nitric acid content does not exceed three to one.

References Cited in the file of this patent

Ewan et al.: Journal of the Society of the Chemical Industry, vol. 40, pages (110T–111T (1921)).

Pellizari: Gazzetta Chimica Italiana, vol. 21, Bd. 2, pp. 405–406 (1891).

Jousselin, Comptes Rendus, vol. 88, page 814 (1879), and vol. 85, p. 548 (1877).